April 19, 1949. W. J. BIGLEY, JR., ET AL 2,468,009
RELEASABLE SUSPENSION APPARATUS
Filed Aug. 30, 1944 5 Sheets-Sheet 2
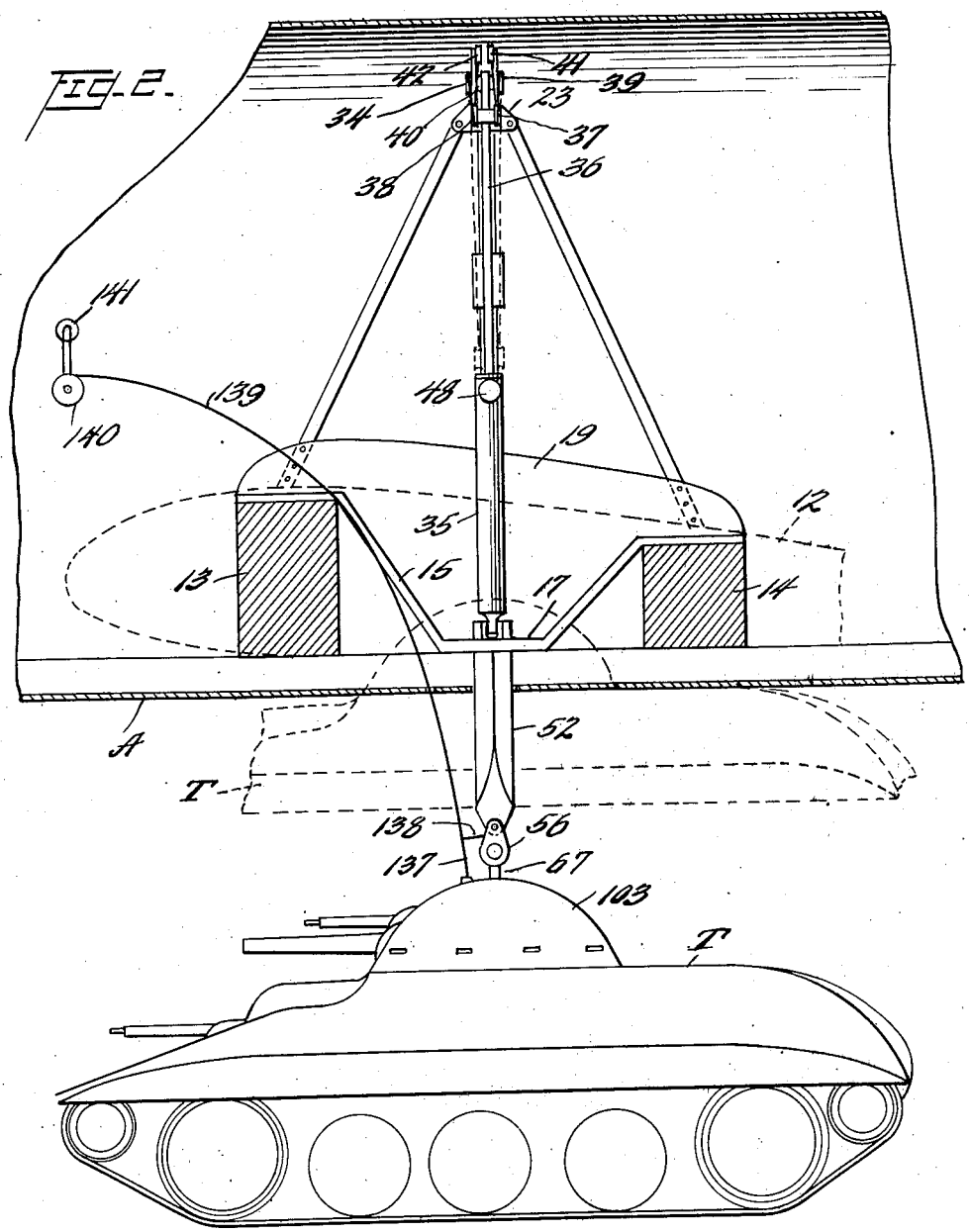
Inventors
William J. Bigley, Jr.
Herbert A. Blenkle,
By
Attorneys

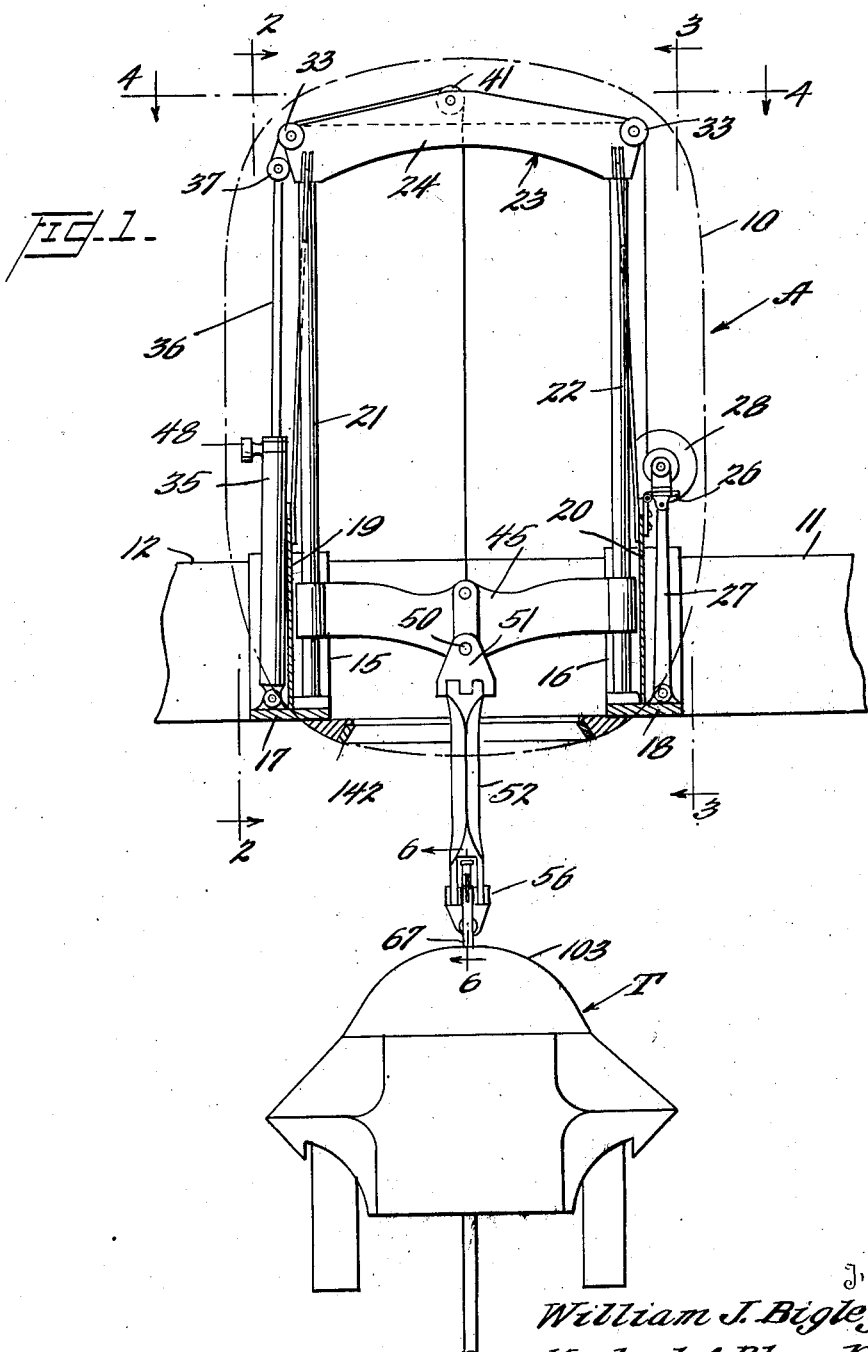

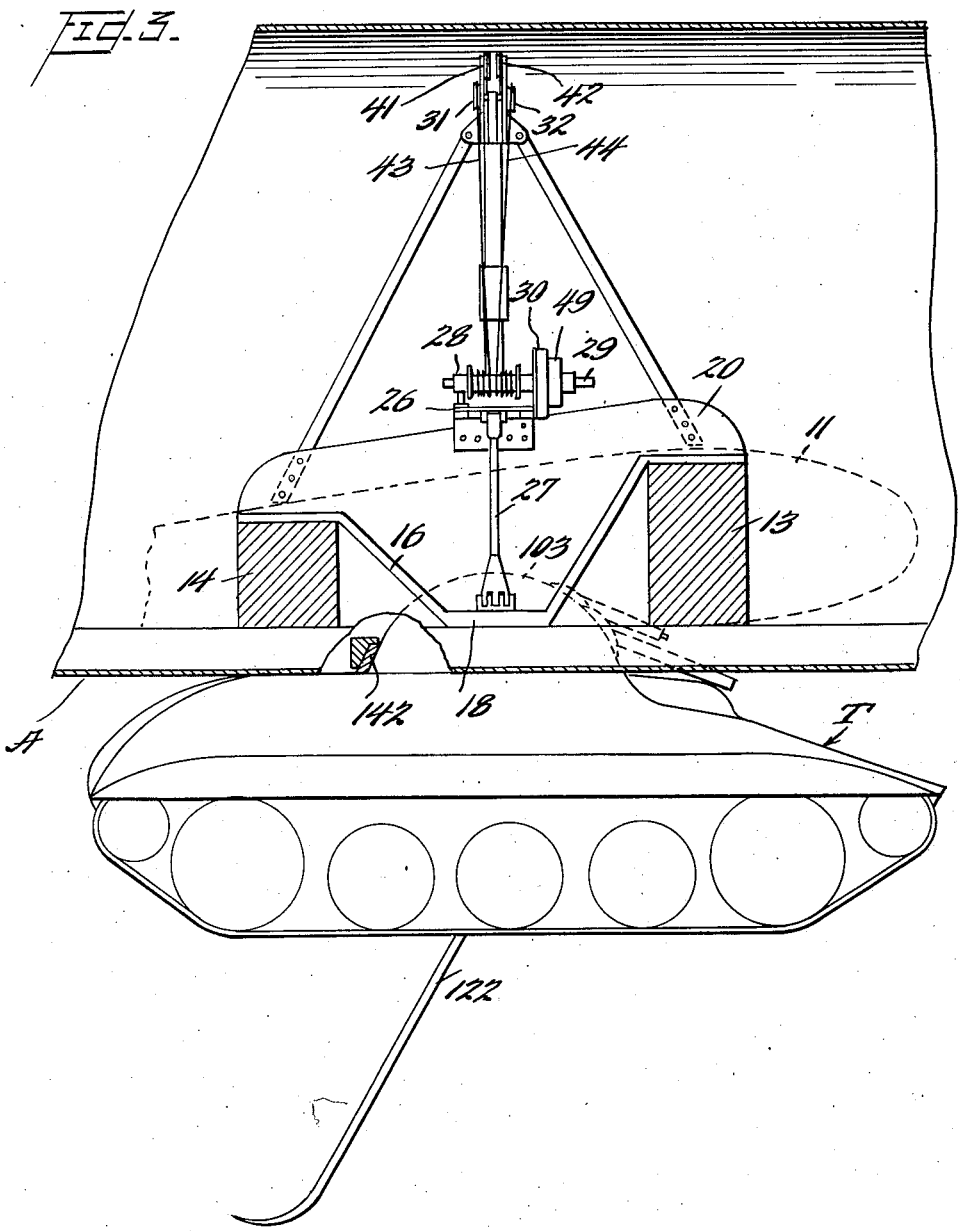

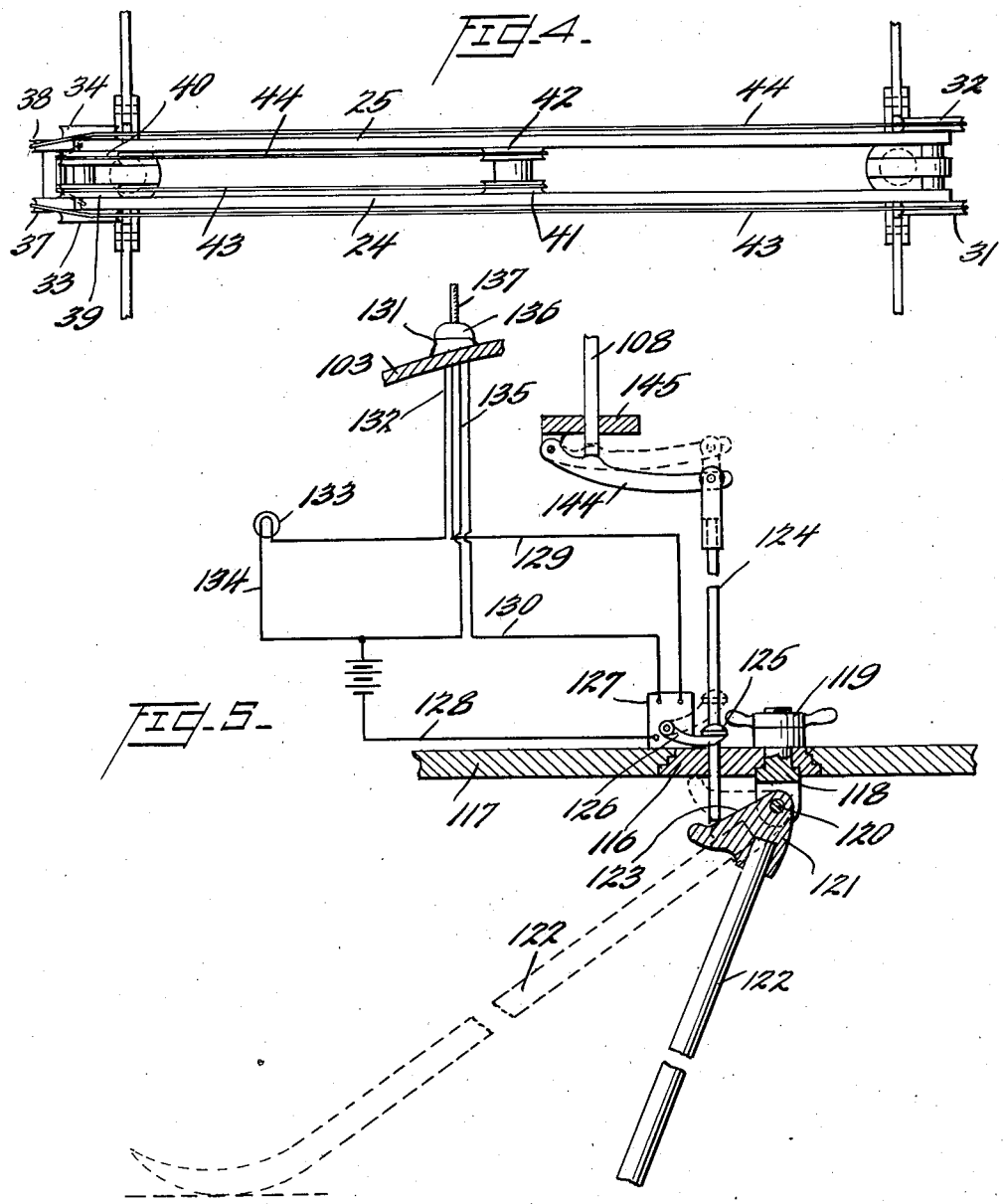

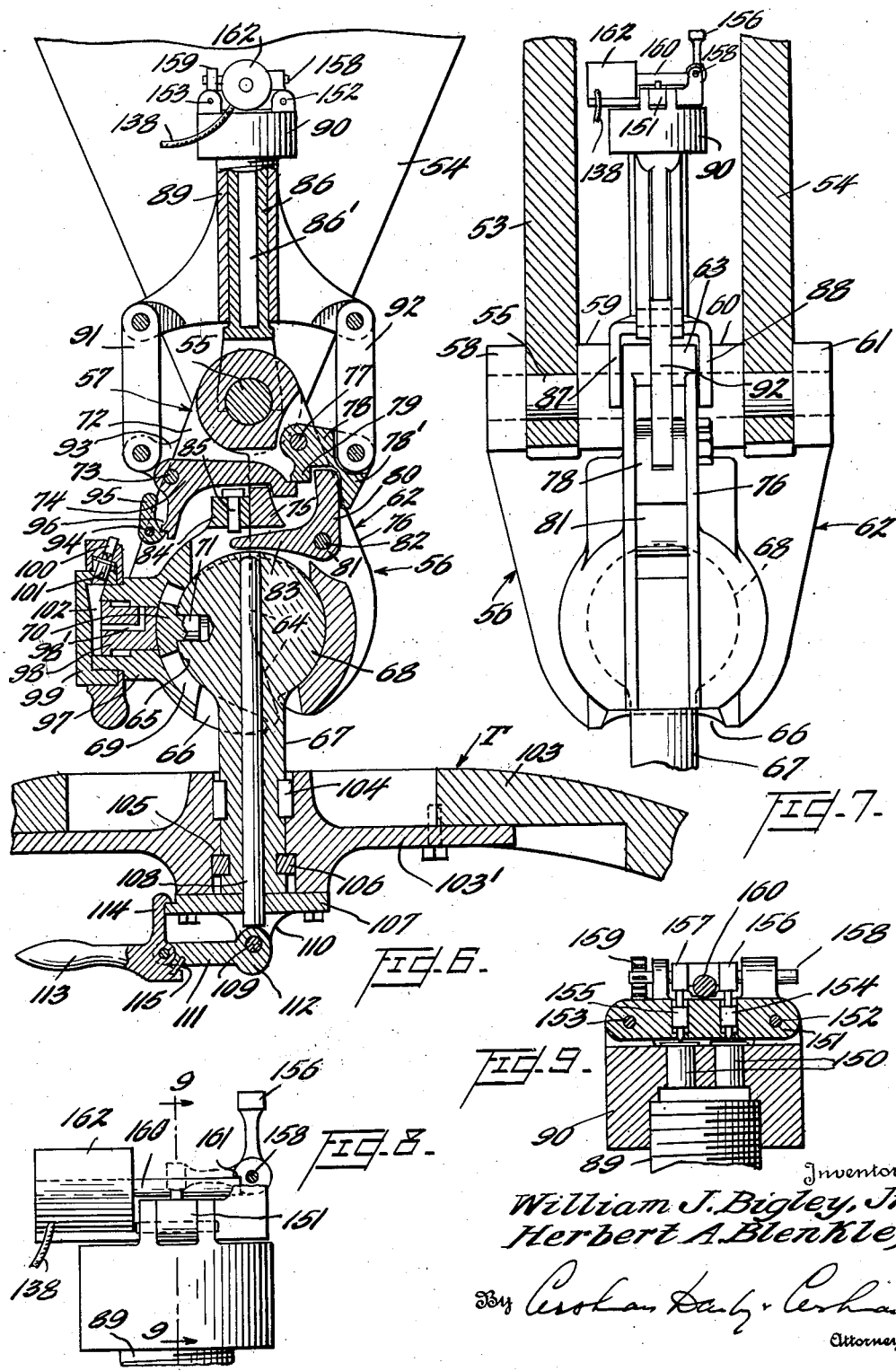

Patented Apr. 19, 1949

2,468,009

UNITED STATES PATENT OFFICE 2,468,009

RELEASABLE SUSPENSION APPARATUS

William J. Bigley, Jr., and Herbert A. Blenkle, New York, N. Y.; said Blenkle assignor to said Bigley, Jr.

Application August 30, 1944, Serial No. 551,956

23 Claims. (Cl. 244—137)

This invention relates to means for detachably associating a land vehicle with an aircraft for aerial transportation to a destination and the launching of the vehicle onto the ground at said destination while the aircraft continues in flight. A principal object of the invention is to provide a connection which will establish a secure association of the aircraft and vehicle during transportation and yet which will instantaneously and completely release at the proper time.

One valuable application of the invention is in the transportation of tanks by airplane and such application is shown by way of example in the accompanying drawings with reference to which the invention will be described.

In the drawings:

Figure 1 is a view showing a partial vertical transverse section of an airplane, the section being taken to the rear of the center of gravity, and a tank in rear elevation, together with suspension means in accordance with the invention;

Figure 2 is a section substantially on line 2—2 of Figure 1 with the suspended tank in side elevation;

Figure 3 is a section substantially on line 3—3 of Figure 1 with the suspended tank in side elevation and in a different relation to the aircraft;

Figure 4 is a section substantially on a line 4—4 of Figure 1;

Figure 5 is a partial diagrammatic vertical longitudinal section of the tank;

Figure 6 is a section substantially on line 6—6 of Figure 1;

Figure 7 is an elevation of the apparatus of Figure 6, as seen from the right of the latter figure;

Figure 8 shows firing mechanism for coupling release, the view being partly in elevation and partly in vertical section, and Figure 9 is a section substantially on line 9—9 of Figure 8.

Referring first to Figures 1 to 3, reference letter A designates generally an airplane and reference letter T a tank. In Figure 1 the fuselage 10 is indicated in dot and dash lines and extending therefrom are the right and left hand wings 11 and 12 of which the former is outlined in Figure 3 and the latter in Figure 2, front and rear wing spars, which extend through the center section being designated by reference numerals 13 and 14.

Reference numerals 15 and 16 designate parallel bars having their ends supported on and secured to the spars 13 and 14, adjacent the sides of the fuselage, the bars being dropped between the spars to provide horizontal bottom portions 17 and 18 in the same plane. Reference numerals 19 and 20 designate reinforcing plates shaped to follow the upper contours of bars 15 and 16, respectively, and welded thereto for reinforcement.

Rising from and fixed to portions 17 and 18, respectively, are a pair of uprights 21 and 22 which are in the same transverse plane, the uprights being rigidly joined at upper ends by a cross member or frame 23 which comprises horizontally spaced apart members 24 and 25, see also Figure 4. Braces extend from plates 19 and 20 to the ends of the cross member.

Mounted on a bracket 26 hinged to the top of plate 20, and held down by a link 27, is a winch 28 to the shaft 29 of which a hand crank can be applied. Releasable pawl and ratchet means are provided in a housing 30 and normally prevent rotation of the winch in the unwinding sense. Mounted on the outside of cross member 23 on a common horizontal axis above the winch is a pair of grooved pulleys 31 and 32 and at the opposite end of the cross member is mounted a similar pair of pulleys 33 and 34 in the planes of pulleys 31 and 32, respectively.

Pivoted to portion 17 on a fore and aft axis outwardly of upright 21 is a cylinder 35 in which is reciprocable a piston to which is secured a piston rod 36 which at its upper end carries pulleys 37 and 38 on a fore and aft axis, these pulleys being spaced apart somewhat less than pulleys 33 and 34, as may be seen in Figure 4. Mounted on the axis of pulleys 33 and 34, but on the inside of elements 24 and 25 of the frame member, is a pair of pulleys 39 and 40, and a further pair of pulleys 41 and 42 is similarly mounted substantially centrally of the cross member 23.

Wound on the drum of winch 28 is cable means here shown as comprising cables 43 and 44 which are led upwardly to pulleys 31 and 32, respectively, across to pulleys 33 and 34, down to and around pulleys 37 and 38, up to pulleys 39 and 40, across to pulleys 41 and 42, and finally down to be secured centrally to a cross head 45 which is slidable on uprights 21 and 22.

In Figure 1 the piston rod 36 is shown fully projected and the cross head is in lowered position. By adjusting a valve 48, pressure fluid can be admitted to the cylinder 35 to retract piston rod 36 and thus elevate cross head 45. When the latter reaches the required elevation valve 48 is closed to lock the fluid in the upper end of the cylinder so that the elevation of the cross head is positively maintained. Through another adjustment of the valve 48 cylinder 35 can be opened to exhaust so that the cross head can drop, under control, by gravity.

Should the source of pressure fluid fail, with the cross head down, as in Figure 1, it can be elevated by operation of the winch 28 which, otherwise, merely serves to anchor the cable ends. The winch may be provided with a brake 49, Figure 3, to permit controlled lowering of the cross head by the winch when the pawl and ratchet are disengaged.

Pivoted centrally to the cross head 45 on a pin 50, whose axis is in the center longitudinal vertical plane of the airplane, is a clevis 51 to the lower end of which is pivoted a rigid link 52 on an axis normally perpendicular to the said plane. At its lower end link 52 is formed as a yoke having arms 53 and 54, Figures 6 and 7, which through a pin 55, parallel to the upper pivoting axis of the link, supports a releasable coupling 56.

Coupling 56 comprises a jaw 57 having knuckles 58, 59, 60 and 61 with aligned bores receiving pin 55, and a jaw 62 having a portion 63 pivoted on pin 55 between knuckles 59 and 60. With the jaws closed they meet along opposite lines as at 64, Figure 6, to define between their free ends a spherical socket 65 having a radial bottom opening 66 through which freely projects a shank 67 fixed to a spherical head 68 which mates with the socket 65. It will be noted that the lower lip of jaw 57 extends past the vertical axis of the head so that a shelf is formed which supports the head, jaw 62 serving merely as a keeper.

Formed in the socket wall in jaw 57 is a parallel walled groove 69 which is symmetrical with respect to a plane bisecting the socket 65 and perpendicular to the axis of pin 55, the outer wall of the groove being concentric with the socket. Slidable in the groove 69 is a block 70 which includes an inwardly projecting pin 71 which is pivotally engaged in a radial bore of head 69 perpendicular to the longitudinal axis of the shank 67. Thus, while the shank is universally tiltable relative to the jaws it cannot swivel relative thereto. Pivoted between side webs as at 72 of jaw 57 on a pin 73 which is parallel to pin 55 is a latch 74 whose free end engages a keeper 75 on jaw 62 to hold the jaws closed. The hook portion of the latch and the engaged lateral face of the keeper are somewhat inclined to the vertical for easy release.

Pivoted between side webs as at 76 of jaw 62 on a pin 77 parallel to pin 55 is a blocking member 78 which projects laterally of the jaw and has a nose 79 normally engaging a flat ledge at the extremity of latch 74. Engaged in a recess of member 78 behind nose 79 is an upwardly extending arm 80 of a bell crank lever 81 pivoted on a pin 82, parallel to pin 55, between the side webs of jaw 62, the other arm 83 of lever 81 extending horizontally beneath and beyond the keeper 75. Above the free end of lever 83 is a horizontal web portion 84 of jaw 57 provided with a vertical bore in which is slidable a headed pin 85 directly beneath the intermediate portion of latch 74.

Reference numeral 86 designates a piston having a bifurcated lower end whose arms 87 and 88 straddle portion 63 of jaw 62, the ends of the arms being arcuately recessed, as shown in Figure 6, and engaging over pin 55. Reference numeral 89 designates a cylinder receiving piston 86 and closed at its upper end by a separable head 90. Cylinder 89 has diametrically opposed wings connected by links 91 and 92 with an ear 93 on jaw 57 and with the free end of member 78, respectively.

Referring to Figures 8 and 9, head 90 is shown as having chambers receiving blank cartridges 150 with their heads beneath a breech block 151 having opposite lug portions removably secured between ears on head 90 by pins 152 and 153. Firing pins 154 and 155 carried by the block are adapted to be struck by hammers 156 and 157 fixed on a spindle 158 pivoted on ears on the block and urged in the firing direction by a spring 159. The hammers are held cocked, Figure 8, by a spring-urged trigger 160 which normally engages a catch 161, the trigger being constituted as an armature associated with a solenoid 162 mounted on the block. Energization of the solenoid causes the cartridges to be fired.

Pivoted between the side webs of jaw 57 on a pin 94 below and parallel to pin 73 is a hammer 95 spring-urged counter-clockwise and normally maintained in the position shown in Figure 6 by a trigger portion 96 of latch 74. Jaw 57 is provided with a laterally projecting neck 97 having a rectangular opening radial to socket 65 off of recess 69 and in which is slidable a piston 98 of a width adapted to enter the recess. Secured to the neck, as by a bayonet joint, and closing the same, is a breach block 99 which carries a blank cartridge 101 adapted to be detonated by a firing pin 100 when struck by hammer 95 when the latter is released by trigger portion 96. A passage leads from the inner end of the cartridge into a chamber 102 outwardly of piston 98.

With the parts in the position shown in Figures 6 and 7, detonation of the charge in head 90 will produce an explosion in chamber 86' tending to move head 90, and therewith cylinder 89, away from piston 86, since the latter cannot move downwardly due to its abutment with pin 55, and a vertical force is exerted on links 91 and 92. Since the lower end of link 91 is anchored to jaw 57, the cylinder and piston unit will swing to the left, swinging member 78 so that latch 74 is released. As member 78 swings, nose 79 thereof strikes arm 80 of the bell crank lever 81 so that arm 83 strikes pin 85 and projects the latter upwardly to knock the latch off of the keeper 75. This brings arm 83 against the bottom of the keeper so that further swinging of member 87 is prevented and, consequently, the force of the explosion now acts to spread the jaws apart.

Release of latch 74 causes the release of hammer 95 so that the latter fires the cartridge 101, the resulting explosion driving the piston 98 against block 70 with the effect of driving jaw 57 away from head 68 so as to free the two. The head of the piston prevents its loss, venting occurring through a passage 98'.

In Figure 6 reference numeral 103' designates a plate secured to the top 103 of the tank turret, the plate having a boss with a vertical bore in which shank 67 is non-rotatably held by keys 104, the weight of the tank being supported through a shoulder 105 which engages a ring 106 set in the lower portion of the shank. The lower end of the bore is closed by a plate 107 having an opening aligned with an axial bore of shank 67 in which is slidable a plunger 108. Pivoted on a pin 109 between ears as at 110 on the bottom of plate 107 is an arm 111 having a cam portion 112 beneath the lower projecting end of plunger 108. Pivoted to the free end of arm 111 is a handle 113 having a catch 114 adapted to engage a keeper portion of plate 107 so as to maintain the arm and handle in the position shown, the handle being urged clockwise by a spring 115 between it and the arm. By pulling down on handle 113 the catch 114 will release and as arm 112 is swung the rise of cam 112 will engage plunger 108 forcing it upwardly against arm 83 of lever 81 so that arm 80, engaging the tail portion 78' of member 78 will swing the latter to release the latch which will then be knocked off by the pin 85.

Upon descent it is desirable that the coupling 56 be automatically opened when the tank is at a predetermined distance from the ground, and that a warning signal be given both in the tank and in the airplane just before uncoupling occurs. Referring in particular to Figure 5, reference numeral 116 designates a plug secured in the floor 117 of the tank and carrying a bolt 118 having a bifurcated end below the plug and a shank extending upwardly through the latter and secured by a hand-operable nut 119. Pivoted in the bifurcated end of bolt 118 on a pin 120 is a fitting 121 having a socket in which is engaged a downwardly extending trailingly disposed feeler 122. The fitting 121 has a cam face 123 adapted to engage the lower end of a vertical rod 124 slidable in a bore in plug 116.

Fixed on rod 124 is a stop 125 under which is engaged the free end of a pivoted switch arm 126 of a switch 127, the switch arm being spring-urged counterclockwise. When the arm moves from its full line position it will first of all connect the battery lead 128 with the conductor 129 and then with the conductor 130. The conductor 129 leads to a socket in a multi-socket receptacle 131 fixed on the top 103 of the tank and from another socket of the receptacle a conductor 132 leads to a signaling device 133 and thence through a conductor 134 to the other side of the battery. The conductor 130 leads to another socket of a receptacle 131 and from another socket a conductor 135 leads to the other side of the battery.

Reference numeral 136 designates a four-pronged plug engagable with the receptacle 131 in the described sockets, the plug having connected thereto an electric cable 137 containing four conductors of which two, indicated at 138, Figures 2 and 6, are in connection with conductors 130 and 135 and are branched off to the solenoid 162. The other two conductors, designated at 139, Figure 2, extend to a reel 130 in the fuselage and thence to an indicating device 141.

The illustrated tank has a low center of gravity and is preferably of the Christy type. When the airplane is on the ground it is supported at such height by the landing wheels that the tank can be run beneath the hoisting apparatus, with the tank facing in the same direction as the plane, so that upon suitably lowering the cross head 45 the jaws of the coupling 56 can be engaged with the head 68 and locked. The jointed linkage permits this to be readily accomplished even though the head 68 is not centered directly below the center of the cross head. The cross head is now elevated and the tank is lifted to seat the base of the turret against a yieldable steadying member 142, Figures 1 and 3, the said member being interrupted in front to provide clearance for the guns, Figure 3.

As the destination is approached, the crew can enter the tank from the fuselage through the usual hatch in the tank turret and the tank is lowered to the relation shown in Figures 1 and 3 so that the turret is well clear of the bottom of the fuselage, the tank being maintained against turning relative to the cross head by means of the non-swivelling linkage which has been hereinbefore described.

As the airplane approaches the ground at a flat angle, the feeler 121 will strike the ground and will be swung clock-wise, Figure 5, so that cam face 123 will force the rod 124 upwardly. When the tank is, for example, about ten feet from the ground, switch 127 will complete a circuit to the devices 133 and 141 so that the occupants of both the tank and the plane will be warned. When the tank, during continued descent, is at a height of, say, about three feet from the ground, rod 124 will be sufficiently displaced so that switch 127 will close a circuit to solenoid 162 and the resultant explosion will immediately release the tank. In Figure 5 the upper end of rod 124 is shown pivoted to a lever 144 pivoted to a plate 145, which may replace the plate 107 of Figure 6, so that the lever is pushing rod 108 upwardly at the time the explosion should occur in head 99 so that even should the latter fail, uncoupling will occur automatically at the substantially predetermined height.

As the tank drops, plug 136 pulls away with the plane. The tank engine having been previously started and the treads being driven at top speed, the tank operator will, at this point, ordinarily slip the clutch since the forward speed of the tank, when it reaches the ground, will ordinarily be greater than the speed of the treads. The latter having been freed will prevent the tank from ending over and the clutch may be reengaged when the forward speed of the tank falls to a speed at which the treads can be driven. Although the tank treads may be drivable to give a speed as high as 70 M. P. H., the minimum flying speed of the plane will ordinarily not be less than 90 M. P. H. When the tank is on the ground, nut 119 may be unthreaded and bolt 118 pushed through to drop the feeler.

From the above it will be seen that the suspension means includes a single releasable coupling whose release completely disconnects the aircraft and the vehicle. A source of danger inherent in the use of plural couplings is thus avoided. In the use of plural couplings, failure of one, or lack of coordination, will cause a serious accident. At the same time, the new suspension means supports the vehicle securely during transportation, positively preventing relative turning about a vertical axis. At the destination, launching can occur either automatically or under the control of an operator, and the release is instantaneous. Should it become necessary to jettison the tank, this can be done by lowering it and then swinging head 99 to release the latch. Or, an operating circuit for this purpose can be led from solenoid 162 into the plane.

Variations are, of course, possible in the form and arrangement of parts and the users thereof and, consequently, the disclosure herein is intended merely as illustrative of a practical and typical arrangement. Such variations are contemplated under the claims which follow.

We claim:

1. In combination, an aircraft, a land vehicle, and non-swivelling suspension means between the aircraft and vehicle, said suspension means being jointed for universal swinging and including a single releasable coupling whose release permits the aircraft and vehicle to separate.

2. In combination, an aircraft, a land vehicle, non-swivelling suspension means between the aircraft and vehicle, said suspension means being jointed for universal swinging and including a single releasable coupling whose release permits the aircraft and vehicle to separate, and means on the aircraft for raising and lowering said suspension means.

3. In combination, an aircraft, a land vehicle, a pendant non-swivelling linkage in connection with the aircraft, a releasable ball and socket coupling of which one member is fixedly secured to the lower end of said linkage and the other member is fixedly secured to the top of said vehicle for the free-swinging suspension of the latter, and means preventing relative rotation of said members on the axis of the coupling.

4. Structure according to claim 3 including a vertically reciprocable cross-head from which said linkage depends.

5. In an aircraft, suspension means comprising a pair of uprights, a cross member rigidly supported by said uprights, a cross head guided by said uprights for reciprocation beneath said cross member, a manually operated winch adjacent one of said uprights, a pulley on said cross member above said winch, a pair of pulleys on said cross member adjacent the other of said uprights, a hydraulic cylinder and piston unit of which the cylinder is anchored and the piston carries a pulley, a pulley mounted centrally of said cross member, and a cable windable on said winch; said cable extending upwardly from the winch to the first-mentioned pulley, across to one of said pair of pulleys, downwardly and around the piston pulley, upwardly to the other of said pair of pulleys, across to said central pulley, and downwardly to said cross head.

6. In combination, an aircraft, a land vehicle, and suspension means between the two comprising a vertically reciprocable cross head in the aircraft, means for reciprocating said cross head, a pendant clevis pivoted to said cross head on a horizontal axis, a rigid link pivoted to said clevis on a horizontal axis, one of said axes extending longitudinally of the aircraft and the other transversely thereof, and a releasable non-swivelling coupling having portions fixedly secured to the lower end of said link and to said land vehicle respectively.

7. In combination, an aircraft, a land vehicle, means for suspending said vehicle from said aircraft, said means including a jaw coupling, a latch holding the coupling closed, and explosive means for releasing the latch, the latch being returnable to holding position whereby to re-establish the coupling.

8. In combination, an aircraft, a land vehicle, means suspending said vehicle from said aircraft, said means including a releasable coupling, signalling means in said vehicle, feeler means projecting below said vehicle, and means operated by said feeler means after contact thereof with the ground upon descent to operate said signalling means when said vehicle is at one elevation and to release said coupling at a lower elevation.

9. In combination, an aircraft, a land vehicle, means for suspending said vehicle from said aircraft, said means including a coupling, an explosive charge arranged to release said coupling upon detonation, a feeler projecting below said vehicle, and means operated as the result of contact of said feeler with the ground upon descent to detonate said charge.

10. In combination, an aircraft, a land vehicle, means suspending said vehicle from said aircraft, said means including a releasable coupling, signalling means in said vehicle, signalling means in said aircraft, feeler means projecting below said vehicle, and means operated by said feeler means after contact thereof with the ground upon descent to operate both of said signalling means when said vehicle is at one elevation and to release said coupling at a lower elevation.

11. In combination, an aircraft, a land vehicle, means suspending said vehicle from said aircraft, said means including a releasable coupling, signalling means in said vehicle, and means operated due to proximity to the ground upon descent to operate said signalling means at one elevation and to release said coupling at a lower elevation.

12. Apparatus according to claim 11 including signalling means in the aircraft arranged for operation simultaneously with the signalling means in the vehicle.

13. In combination, an aircraft, a land vehicle, means for suspending said vehicle from said aircraft, said means including a coupling having a plurality of jaws and a head engaged thereby, a latch normally holding the jaws closed, and means operable to release the latch and to spread said jaws.

14. In combination, an aircraft, a land vehicle, means for suspending said vehicle from said aircraft, said means including a coupling having a plurality of jaws and a head engaged thereby, a latch normally holding the jaws closed and means operable to release the latch, an explosive charge arranged to have a displacing effect on said head relative to one of said jaws upon detonation, and means operative upon release of the latch to detonate said charge.

15. In combination, an aircraft, a land vehicle, means for suspending said vehicle from said aircraft, said means including a jaw coupling, a latch holding the coupling closed, explosive means for releasing the latch, and means operable from said vehicle independently of said explosive means to release said latch.

16. In combination, an aircraft, a land vehicle, means for suspending said vehicle from said aircraft, said means including a coupling having a plurality of jaws in connection with the aircraft and a head engaged by said jaws, a shank connecting said head with said vehicle, a latch holding said jaws closed, explosive means for releasing said latch, a plunger slidable in an axial bore of said shank and arranged to release said latch upon displacement in said bore, and means operable from said vehicle for effecting such displacement.

17. In combination, an airplane, a tank having a top turret, a vertically reciprocable cross head in the airplane, a flexible non-swivelling connection between said cross head and the top of said turret, said connection including a single releasable coupling, means for elevating the cross head and therewith the tank, and seating means on the airplane against which the lower part of the turret bears for steadying when the tank is fully elevated.

18. A quick release coupling comprising a pair of pivoted jaws, a head engaged by said jaws when they are closed, a latch pivoted on one of said jaws and a keeper on the other of said jaws normally engaged by said latch to hold the jaws closed, a blocking member for said latch pivoted on said other jaw and normally preventing disengagement of said latch from said keeper, means for moving the blocking member to release the latch, and knock-off means for the latch operated upon release of said latch by said blocking member.

19. A quick release coupling comprising a pair of pivoted jaws, a head engaged by said jaws when they are closed, a latch pivoted on one of said jaws on an axis parallel to the jaw axis, a keeper on the other of said jaws normally engaged by said latch to hold the jaws closed, a blocking member for said latch pivoted on said other jaw on an axis parallel to the jaw axis and normally preventing disengagement of said latch from said keeper, said blocking member having a free end projecting outwardly and laterally of its associated jaw, cylinder and piston means on the other side of the jaw axis from the jaws, said means defining a closed chamber between them, one of said means having pivotal abutment with the jaw pivot, links connecting the other of said means with said one of said jaws and with said free end of said blocking member respectively, means for producing an explosive force in said chamber whereby said other of said means is displaced outwardly to release said blocking member, means on said other jaw limiting the releasing movement of said blocking member, the displacement of said other of said means acting to spread said jaws after the releasing limit of said blocking member has been reached, and knock-off means for the latch operative upon release of the latch by the blocking member.

20. A quick release coupling comprising a pair of pivoted jaws defining a spherical socket between them when closed, said socket having a radial opening at the free ends of the jaws, releasable means holding the jaws closed, a spherical head in said socket having a shank extending freely through said opening whereby universal tilting of said shank relative to said jaws is permitted, a groove in a side wall of said socket in a plane bisecting the socket and perpendicular to the jaw axis, a block slidable in said groove and having a pin pivotally engaged in a bore in said head perpendicular to the longitudinal axis of said shank whereby swivelling of the head relative to the jaws is prevented, means for releasing said holding means, and means acting upon release of said holding means to expel said block from said groove to thereby relatively displace said head and the jaw in which said groove is formed.

21. In combination, an aircraft, a vehicle and means for suspending the vehicle beneath the aircraft, said means comprising an upwardly and downwardly movable elevator member in the aircraft, means for raising and lowering said member, and a single releasable coupling carried by said member for releasably holding the vehicle, said coupling having surfaces preventing relative swivelings between the vehicle and craft and thereby maintaining the vehicle and aircraft in longitudinal alignment, but facilitating relative longitudinal tipping therebetween, whereby the vehicle may be lowered away from the craft and may swing about a transverse horizontal axis for leveling of the vehicle prior to release.

22. In combination, an aircraft, a vehicle and means for suspending the vehicle beneath the aircraft, said means comprising an upwardly and downwardly movable elevator member in the aircraft, means for raising and lowering said member, and a single releasable coupling carried by said member for releasably holding the vehicle, said coupling having surfaces maintaining the vehicle and craft in longitudinal alignment but permitting lateral and fore and aft tipping of the vehicle relative to the craft when said member is lowered, whereby the vehicle may be lowered away from the craft, is maintained in longitudinal alignment therewith, but is free to tip universally for levelling of the vehicle prior to release.

23. In combination, an aircraft having an opening in its undersurface, a vehicle and means for suspending the vehicle beneath the aircraft, said means comprising an upwardly and downwardly movable elevator member in the craft, a releasable coupling secured to the member for connection with the vehicle, means for raising the member to seat an upper portion of the vehicle against the margins of said opening, and means for lowering said member to suspend the vehicle well below the aircraft prior to release, said coupling including means maintaining the vehicle and aircraft in longitudinal alignment, but permitting fore and aft tipping of the vehicle relative to the aircraft for leveling of the vehicle prior to release.

WILLIAM J. BIGLEY, JR.
HERBERT A. BLENKLE.

REFERENCES CITED

The following references are of record in the file of this patent:

UNITED STATES PATENTS

| Number | Name | Date |
|---|---|---|
| 181,761 | Borger | Aug. 29, 1876 |
| 269,994 | Bailey | Jan. 2, 1883 |
| 909,280 | Camp | Jan. 12, 1909 |
| 1,306,348 | Lewis | June 10, 1919 |
| 1,566,678 | Latimer | Dec. 22, 1925 |
| 1,672,163 | Krammer | June 5, 1928 |
| 1,775,583 | Boucher et al. | Sept. 9, 1930 |
| 1,792,738 | Hall | Feb. 17, 1931 |
| 1,810,680 | Rothgarn | June 16, 1931 |
| 1,908,408 | Cox | May 9, 1933 |
| 1,981,461 | Miller | Nov. 20, 1934 |
| 2,139,597 | Martin | Dec. 6, 1938 |
| 2,310,887 | Andersen | Feb. 9, 1943 |
| 2,356,155 | Fogle | Aug. 22, 1944 |

FOREIGN PATENTS

| Number | Country | Date |
|---|---|---|
| 633,131 | Germany | July 20, 1936 |